United States Patent [19]

Luhrsen et al.

[11] Patent Number: 5,171,495
[45] Date of Patent: Dec. 15, 1992

[54] IMMERSION NOZZLES FOR METAL MELTS

[75] Inventors: Ernst Luhrsen, Bad Schwalbach; Albert Ott, Waldems-Wustems, both of Fed. Rep. of Germany

[73] Assignee: Didier-Werke AG, Wiesbaden, Fed. Rep. of Germany

[21] Appl. No.: 775,111

[22] Filed: Oct. 11, 1991

Related U.S. Application Data

[63] Continuation-in-part of Ser. No. 386,593, Jul. 31, 1989, abandoned.

[30] Foreign Application Priority Data

Aug. 12, 1988 [DE] Fed. Rep. of Germany ....... 3827424

[51] Int. Cl.$^5$ ............................................. C04B 35/10
[52] U.S. Cl. ..................................... 264/63; 264/109; 501/89; 501/98
[58] Field of Search .................... 264/63, 109; 501/89, 501/98

[56] References Cited

U.S. PATENT DOCUMENTS

| | | | |
|---|---|---|---|
| 3,759,725 | 9/1973 | Steen et al. | 501/89 |
| 3,979,214 | 9/1976 | Trastel | 501/89 |
| 4,634,685 | 1/1987 | Pohl et al. | 264/63 |
| 4,857,488 | 8/1989 | Aiba et al. | 264/63 |

FOREIGN PATENT DOCUMENTS

| | | |
|---|---|---|
| 3003046 | 7/1981 | Fed. Rep. of Germany . |
| 3401999 | 10/1985 | Fed. Rep. of Germany . |
| 3439954 | 5/1986 | Fed. Rep. of Germany . |
| 60-9981 | 3/1985 | Japan . |
| 2067985 | 8/1981 | United Kingdom . |

*Primary Examiner*—James Derrington
*Attorney, Agent, or Firm*—Wenderoth, Lind & Ponack

[57] ABSTRACT

A refractory immersion nozzle which can be used for processing metal melts, and a process for producing the nozzle by providing a mixture containing alumina having a maximum grain size of 250 microns, an aggregate having less tendency than alumina to form incrustations during use of the nozzle, boron nitride, a fluxing agent, a bonding agent and a mixing liquid, molding the mixture to form a shaped body, and drying the shaped body. The nozzle inhibits accretion of slag constituents from the metal melts, and has sufficiently good spalling resistance.

7 Claims, No Drawings

IMMERSION NOZZLES FOR METAL MELTS

CROSS-REFERENCE TO RELATED APPLICATION

This application is a continuation-in-part of Ser. No. 07/386,593 filed Jul. 31, 1989, now abandoned.

BACKGROUND OF THE INVENTION

The present invention relates to an immersion nozzle for metal melts, more particularly steel melts, and a process for producing the nozzle from a starting mix containing alumina and boron nitride, using at least one fluxing agent, at least one binder and optionally other standard admixed materials, by mixing the starting mix with liquid, molding and drying the mixture and, if necessary, firing the resultant shaped body.

Immersion nozzles are employed for the further processing of metal melts, especially for the continuous casting of steel.

West German Patent 30 03 046 discloses a ceramic batch which is based on alumina or zirconia or silica, carbon and binders for producing such immersion nozzles, and which contains 5 to 15 weight % of calcium-silicon and/or ferrosilicon and/or boron nitride. The boron nitride is intended to achieve a lowering of the melting point of the solid oxidic suspensions, e.g., alumina constituents with a size of 1 to 30 mm, which are present in the steel, so that they become molten and do not adhere to the refractory wall. However, a mix of various refractory materials is not proposed in this West German Patent No. 30 03 046 and, furthermore, there is no showing of the grain size of the corundum (alumina) used.

West German Laid-open Application No. 34 39 954 discloses a refractory wear part for the casting of molten melts that is made from a mix of $Al_2O_3$, graphite, a combination of fluxing agents and a carbon-containing binder as well as a metal powder, and in which the fired wear part is completely or partly raw-glazed and is thereafter fired under oxidizing conditions, if desired. However, only alumina is employed as refractory material for producing these refractory wear parts, and no boron nitride is used.

West German Patent No. 34 01 999 discloses immersion nozzles in which a layer of boron nitride is applied onto the surfaces coming into contact with the steel.

When using immersion nozzles, especially in the case of steel melts, the above-mentioned problem of adhesion of oxidic constituents contained in the steel melt arises, whereby clogging of the nozzle can develop, leading to interruption of the casing of the metal melts. However, the longest possible casting times are absolutely necessary for reasons of cost.

A further problem of immersion nozzles is their spalling resistance, which must be high enough so as to prevent cracking and premature replacement of the nozzles.

SUMMARY OF THE INVENTION

It has now been found that such accretion of oxidic slag constituents of the metal melt can be prevented in immersion nozzles by using the most finely divided alumina possible, together with a fluxing agent and boron nitride, even though the spalling resistance becomes poorer if fine alumina is used. Normally, alumina has heretofore been employed in grain sizes as large as 0.5 mm if it was employed for producing immersion nozzles. However, when using such coarse-grained alumina, accumulation of oxidic constituents, especially of alumina from the steel, has always occurred.

The object of the present invention is therefore to provide an immersion nozzle that not only exhibits less tendency to accretion or clogging, but also has a sufficiently high spalling resistance.

This object is achieved with the process for producing an immersion nozzle of the type described above, wherein
a) part of the alumina employed is replaced by other aggregates having lesser tendency than alumina to form incrustations, and
b) alumina with a certain maximum grain size is used.

DETAILED DESCRIPTION OF THE INVENTION

More specifically, the present invention provides a process for producing a refractory immersion nozzle useable for processing metal melts, which comprises providing a mixture containing alumina having a maximum grain size of 150 microns, an aggregate having less tendency than alumina to form incrustations during use of the nozzle, boron nitride, a fluxing agent, a binder, and a mixing liquid; molding the mixture to form a shaped body; and drying the shaped body.

According to particularly advantageous embodiments, alumina with a maximum grain size of preferably 90 microns, and especially preferably 44 microns, is used. The smaller the maximum grain size of the alumina used, the lesser is the tendency to adhesion of oxidic constituents from the metal melt, even though the tendency to deterioration of the spalling resistance exists because of too fine-grained structure.

Thus, the other aggregates with lesser tendency than alumina to form incrustations are employed with coarser grain sizes than that of the alumina being used, i.e., advantageously with a minimum grain size of 44 microns, preferably with a minimum grain size of 90 microns, and especially preferably with a minimum grain size of 150 microns. The maximum grain size of these other refractory aggregates extends up to values of 1.0 mm, or preferably 0.5 mm.

According to an advantageous embodiment use is made of alumina with a maximum particle size of 150 microns and aggregate with a minimum particle size of 150 microns. In another advantageous embodiment alumina with a maximum particle size of 90 microns and aggregate with a minimum particle size of 90 microns are used. Furthermore, alumina with a maximum particle size of 44 microns and aggregate with a minimum particle size of 44 $\mu m$ can be used.

Preferably, the median value of the grain size of the alumina is at least 100 microns less than the median value of the grain size of the aggregate. The median value is the grain size where the distribution of the granularity of a component reaches 50 weight % of the component.

The combination of finer-grained alumina and coarser-grained other refractory materials permits improvement of the spalling resistance of the finished immersion nozzle, thereby solving not only the problem of clogging of the nozzle but also the problem of maintaining good spalling resistance; this spalling resistance is at least as good as that of an immersion nozzle made with coarse-grained alumina.

The alumina employed for the process according to the invention may be a standard material used for refractory purposes, e.g., appropriately fine-grained fused corundum or tabular alumina.

The other refractory or oxidic aggregates that have less tendency than alumina to form incrustations are mullite, silicon carbide, and fused lime. These other refractory materials can be employed individually together with the alumina.

According to an advantageous embodiment, the weight ratio of alumina to the other refractory aggregates in the starting mix is 30:70 to 70:30. The advantages obtained thereby are, firstly, the good refractory properties of alumina are effective and, secondly, a sufficient spalling resistance is achieved because of the use of the other aggregates. The grain size of these other aggregates usually extends up to a maximum grain size of 1.0 mm, preferably 0.5 mm, i.e., their grain size corresponds to the standard grain sizes used for producing such immersion nozzles.

According to another preferred embodiment, graphite and/or elemental silicon can be added as a further admixed material to the starting mix. Advantageously flake graphite is used as the graphite, and usually the elemental silicon is employed in finely divided form, i.e., with a maximum grain size of 0.2 mm. The use of flake graphite makes some of the expensive boron nitride unnecessary. Elemental silicon is used to strengthen and to protect the carbon bonding from oxidation.

When producing the immersion nozzles according to the invention, at least one fluxing agent is used which can be selected from the fluxing agents normally used for producing immersion nozzles. For this purpose, a boron-free or boron-containing fluxing agent can be used. Examples thereof are glass frits, feldspars, boric acid, borax, etc.

According to a preferred embodiment, a fluxing agent combination of a glass frit and a feldspar, particularly an alkali metal feldspar, is used as the fluxing agent. The glass frit used can be a boron-containing glass frit, e.g., a glass frit having an approximate oxide composition of 30% $SiO_2$, 6% $Al_2O_3$, 4% $Fe_2O_3$, 8% CaO, 1% MgO, 0.4% $Mn_3O_4$, 25% $Na_2O$, 2% $P_2O_5$, 3.2% BaO and 20% $B_2O_3$. Furthermore, it is also possible to use so-called glass frits having an approximate oxide composition of, e.g., 66% $SiO_2$, 23% $Al_2O_3$, 5% CaO, 4% ZnO and 2% $Li_2O$. If such boron-free glass frits are used, it is also advantageous to employ a boron-containing fluxing agent of the type mentioned above.

When producing the immersion nozzles according to the invention, a standard temporary bonding agent is also used. According to a preferred embodiment, a resin, especially a synthetic resin in the form of a novolak or a resol resin, or even a standard pitch may be used as the temporary binder. The synthetic resin and pitch can also be employed as a mixture. When using a curable synthetic resin, a suitable curing agent, e.g., hexamethylenetetramine, may be added in a quantity necessary for curing the synthetic resin, for example, when using novolaks. When using resol resins, addition of a curing agent is usually not necessary.

The boron nitride used for producing the immersion nozzles according to the invention is hexagonal and is normally used in fine-grained form, i.e., with a grain size of smaller than 100 microns. The proportion of the added boron nitride relative to the dry starting mix preferably lies in the range of 5 to 20 weight %, based on the weight of the dry starting mix. The proportion of elemental silicon, when added, is preferably in the range of 3 to 8 weight % relative to the dry starting mix, and the proportion of graphite, when added, is preferably in the range of 5 to 20 weight %.

Use can also be made of a mixture which contains 5 to 20 weight % of boron nitride and 5 to 20 weight % of graphite, wherein the sum of boron nitride and graphite is 20 to 25 weight %, based on the dry weight of the mixture.

The fluxing agents are used in a proportion between 2 and 12 weight % relative to the dry starting mix.

The bonding agent is generally employed in a proportion of 5 to 20 weight % relative to the dry starting mix.

The mixing liquid employed in the present invention is used for the purpose of permitting the starting mix to be molded to form a shaped body. Any liquid suitable for this purpose can be used. For example, a solution of the bonding agent will provide sufficient mixing liquid to permit molding of the mixture to form the shaped body.

In a preferred embodiment the invention provides a process for producing a refractory immersion nozzle, which comprises providing a mixture containing alumina having a maximum grain size of 150 microns, an aggregate having less tendency than alumina to form incrustations during use of the nozzle selected from the group consisting of mullite, silicon carbide and fused lime having a minimum grain size of 150 microns, boron nitride, a fluxing agent, a bonding agent and a mixing liquid, with the proviso that the aggregate has a coarser grain size than the alumina in the mixture, and wherein the mixture contains the alumina in a weight ratio of from 30:70 to 70:30 for the weight ratio of alumina to aggregate; molding the mixture to form a shaped body; and drying the shaped body.

After the shaped body is formed, it is dried, and if desired, then fired. Standard drying and firing conditions can be employed.

The invention is explained below in more detail by reference to the following examples.

EXAMPLES

The dry components of the mixtures according to the examples (table) were thoroughly premixed in a mixer. Finally, the resol resin or novolak resin solution was added. The resin solutions sufficed as mixing liquid.

Following thorough mixing, an immersion nozzle was molded from the mixture, dried at 120° C. for 4 hours, and subsequently cured for 6 hours at 180° C. This nozzle was then slowly heated in a reducing atmosphere and fired at 1,000° C. for 4 hours.

The immersion nozzle according to Example 1 showed, during use, only a very low tendency of the oxidic components to adhere to the surfaces making contact with the liquid steel, and exhibited sufficiently good thermal shock resistance.

The procedure of Example 1 was repeated in Examples 2 to 4 with the starting components specified in the table. Immersion nozzles were obtained that exhibited only a low tendency of the slag components of the steel melt to stick to the nozzles, and the nozzles had a sufficiently high thermal shock resistance.

Example 5 and 6 are outside the scope of the present invention since they do not contain the aggregate having less tendency than alumina to form incrustations during use.

Example 5 according to the prior art yielded immersion nozzles on which the oxidic components formed significant deposits.

With the boron nitride content in Example 6 a lower tendency to form deposits was obtained, but the behavior of the nozzles was still not satisfactory when compared to the immersion nozzles of Examples 1 to 4 according to the present invention.

TABLE

| Example: | | | 1 | 2 | 3 | 4 | 5 | 6 |
|---|---|---|---|---|---|---|---|---|
| Fused corundum, max. | 90 μm | (parts by weight) | | 14 | | 10.5 | | |
| Fused corundum, max. | 150 μm | (parts by weight) | 12 | | | | 12 | 12 |
| Fused corundum, max. | 150–500 μm | (parts by weight) | | | | | 19.5 | 19.5 |
| Tabular alumina, max. | 44 μm | (parts by weight) | 14.5 | 5 | 22.5 | 20 | 14.5 | 14.5 |
| Silicon carbide, | 90–500 μm | (parts by weight) | | 27 | | | | |
| Silicon carbide, | 150–500 μm | (parts by weight) | 19.5 | | | | | |
| Mullite, | 44–500 μm | (parts by weight) | | | 23 | | | |
| Fused lime, | 90–500 μm | (parts by weight) | | | | 20 | | |
| Flake graphite | | (parts by weight) | 15 | 15 | 12 | 15 | 25 | 15 |
| Feldspar | | (parts by weight) | 6.5 | 6.5 | 6.5 | 5 | 6.5 | 6.5 |
| Borax | | (parts by weight) | 1.5 | 1.5 | 1.5 | 1.5 | 1.5 | 1.5 |
| Boron-containing glass frit | | (parts by weight) | 2.5 | 2.5 | 2.5 | | 2.5 | 2.5 |
| Boron-free glass frit | | (parts by weight) | | | | 2.5 | | |
| Boron nitride, max. | 100 μm | (parts by weight) | 10 | 10 | 13 | 7.5 | | 10 |
| Silicon, max. | 75 μm | (parts by weight) | 5 | 5 | 5 | 3 | 5 | 5 |
| Resol resin | | (parts by weight) | 13.5 | 13.5 | 14 | | 13.5 | 13.5 |
| Novolak resin | | (parts by weight) | | | | 15 | | |
| Curing agent (hexamethylenetetramine) | | (parts by weight) | | | | | +2 | |
| Aluminum oxide/other additives | | (parts by weight) | 58:42 | 41:59 | 49:51 | 60:40 | | |
| Aluminum oxide and other additives | | (parts by weight) | 46 | 46 | 45.5 | 50.5 | 46 | 46 |
| Graphite and boron nitride | | (parts by weight) | 25 | 25 | 25 | 22.5 | 25 | 25 |

We claim:

1. A process for producing a refractory immersion nozzle useable for processing metal melts, which comprises:

providing a mixture containing alumina having a maximum grain size of 150 microns, an aggregate having less tendency than alumina to form incrustations during use of then nozzle selected from the group consisting of mullite, silicon carbide and fused lime having a minimum grain size of 150 microns, 5 to 20 weight % of boron nitride, 5 to 20 weight % of graphite, the sum of boron nitride and graphite being 20 to 25 weight %, based on the dry weight of said mixture, a fluxing agent, a bonding agent selected from the group consisting of a resin, pitch and a mixture thereof, and a mixing liquid, with the proviso that said aggregate has a coarser grain size than the alumina in said mixture, and wherein said mixture contains said alumina in a weight ratio of from 30:70 to 70:30 for the weight ratio of said alumina to said aggregate;

molding said mixture to form a shaped body; and drying said shaped body.

2. A process for producing a refractory immersion nozzle useable for processing metal melts, which comprises:

providing a mixture containing alumina having a maximum grain size of 90 microns, an aggregate having less tendency than alumina to form incrustations during use of the nozzle selected from the group consisting of mullite, silicon carbide and fused lime having a minimum grain size of 90 microns, 5 to 20 weight % of boron nitride, 5 to 20 weight % of graphite, the sum of boron nitride and graphite being 20 to 25 weight %, based on the dry weight of said mixture, a fluxing agent, a bonding agent selected from the group consisting of a resin, pitch and a mixture thereof, and a mixing liquid, with the proviso that said aggregate has a coarser grain size than the alumina in said mixture, and wherein said mixture contains said alumina in a weight ratio of from 30:70 to 70:30 for the weight ratio of said alumina to said aggregate;

molding said mixture to form a shaped body; and drying said shaped body.

3. A process for producing a refractory immersion nozzle useable for processing metal melts, which comprises:

providing a mixture containing alumina having a maximum grain size of 44 microns, an aggregate having less tendency than alumina to form incrustations during use of the nozzle selected from the group consisting of mullite, silicon carbide and fused lime having a minimum grain size of 44 microns, 5 to 20 weight % of boron nitride, 5 to 20 weight % of graphite, the sum of boron nitride and graphite being 20 to 25 weight %, based on the dry weight of said mixture, a fluxing agent, a bonding agent selected from the group consisting of a resin, pitch and a mixture thereof, and a mixing liquid, with the proviso that said aggregate has a coarser grain size than the alumina in said mixture, and wherein said mixture contains said alumina in a weight ratio of from 30:70 to 70:30 for the weight ratio of said alumina to said aggregate;

molding said mixture to form a shaped body; and drying said shaped body.

4. The process according to claim 1, 2 or 3 wherein said mixture further contains elemental silicon.

5. The process according to claim 1, 2 or 3 wherein said fluxing agent is a combination of a glass frit and a feldspar.

6. The process according to claim 5, wherein said fluxing agent includes a boron-containing fluxing agent.

7. The process according to claim 1, 2 or 3 which further comprises firing the dried shaped body.

* * * * *